US00RE35327E

United States Patent [19]

Sing

[11] E Patent Number: Re. 35,327

[45] Reissued Date of Patent: Sep. 10, 1996

[54] METHOD OF CONVERTING LOGS AND RESULTANT PRODUCT

[76] Inventor: Peter Sing, P.O. Box 11532, Winslow, Wash. 98110

[21] Appl. No.: 208,341

[22] Filed: Mar. 9, 1994

Related U.S. Patent Documents

Reissue of:

[64] Patent No.: 5,115,609
Issued: May 26, 1992
Appl. No.: 725,296
Filed: Jul. 3, 1991

[51] Int. Cl.[6] ..... B27C 9/00; E04C 1/00; B27M 1/08

[52] U.S. Cl. ..... 52/309.9; 52/309.15; 52/309.11; 52/730.7; 144/345; 144/340; 144/356; 144/353; 144/367; 144/368

[58] Field of Search ..... 52/233, 309.9, 52/309.11, 309.14, 309.15, 309.16, 407.3, 730.7; 29/428, 457, 459, 825; 144/3 R, 340, 345, 347, 353, 364, 367, 368, 370, 136 H

[56] References Cited

FOREIGN PATENT DOCUMENTS

| | | |
|---|---|---|
| 2027356 | 4/1991 | Canada . |
| 388507 | 7/1989 | European Pat. Off. . |
| 1215502 | 11/1989 | European Pat. Off. . |
| 518246 | 6/1992 | European Pat. Off. . |
| 962589 | 12/1949 | France . |
| 2512729 | 3/1983 | France . |
| 3928322 | 2/1991 | Germany . |
| 465412 | 6/1987 | Sweden . |

*Primary Examiner*—W. Donald Bray
*Attorney, Agent, or Firm*—Nathaniel Altman

[57] ABSTRACT

The method of converting logs involves cutting each log longitudinally and diametrically at right angles into equal quarter-log segments, the rearranging the quarter-logs so that the arcuate surfaces of the segments face inwardly toward each other, while their cut flat surfaces are positioned to form a rectangle in cross-section. The segments so positioned may be joined together as such, rigid foam plastic insulation may be introduced into the space remaining between the segments, or support bracing and other insulation may take the place of the rigid foam. The resultant converted logs may be used as beams, joists or bearing-wall members; devices for aligning, registering and sealing the converted logs together are provided.

20 Claims, 3 Drawing Sheets

METHOD OF CONVERTING LOGS AND RESULTANT PRODUCT

Matter enclosed in heavy brackets [ ] appears in the original patent but forms no part of this reissue specification; matter printed in italics indicates the additions made by reissue.

BACKGROUND OF THE INVENTION

Wood has been the preferred building material for homes, bungalows, cottages and cabins for hundreds of years. Log structures are now extremely popular for their beauty, efficiency and comfort; many log buildings are being offered for sale and can be erected from plans and pre-cut log timbers provided by suppliers.

FIGS. 1A–1C of the accompanying drawings show a range of conventional prior art log wall assembly methods in present use. In FIG. 1A, each log L has an arcuate cut-out C along its entire length to accommodate the next log L in nesting relationship. This assembly method is called "Swedish Cope", and the logs are fixed into place by vertical rods or bolts R, extending through aligned bores B.

The logs L' of FIG. 1B are provided with dual tongues T and dual grooves G for interlocking relationship with each other; and FIG. 1C illustrates an assembly method which combines the arcuate cut-outs C of FIG. 1A with the tongue-and-groove technique of FIG. 1B. Logs L" of FIG. 1C are all bored axially as at 0 for the insulative effect of air space and to provide a conduit for concealed wiring, piping or the like.

Walls constructed according to the above methods are adequate for a rough camping cabin or the like, but all share the disadvantages of diminished insulative effect resulting from the reduced wall thicknesses D, D' and D", which control the transfer of heat or cold through each respective wall. In addition, dirt and dust collecting in the crevices where the logs meet is difficult to prevent or remove. For more comfortable living, the inner wall surface must be covered with plasterboard or other drywall construction, which adds very considerably to the building's costs and eliminates the option of maintaining the charm and beauty of a clear interior wood finish.

FIG. 1D illustrates a form of wood exterior wall construction currently in use, which features laminated wood panels P formed with interlocking tongues T' and grooves G', and with centrally disposed foam insulating core I. Structures built with this system are very satisfactory in appearance and performance, but are considerably more expensive, largely due to the extensive milling operations and processes required to form this composite laminated building material.

It is the principal object of this invention to provide a method of preparing logs for making a product free of all the disadvantages of the above-described prior art, and which has its own distinct advantages as follows: 1) Smaller logs, requiring less growing time and therefore less expensive than the logs of conventional log construction are used. 2) The converted logs of this invention, when erected as a wall, present both interior and exterior smooth and flat for easy finishing, without the need for installing plasterboard or the like as the inside facing of the wall, and retaining the warmth and beauty of wood grain optionally inside and out. 3) The converted logs of this invention are much lighter in weight than conventional logs, and far easier to handle and install. 4) The strength of the converted logs is at least as great as that of much larger conventional logs and sufficient to permit their use as beams, joists or in load-bearing walls with the novel converted logs oriented either vertically or horizontally. 5) The insulation value of the converted logs is greater than that of conventional logs at least one and one-half times larger in diameter. 6) No significant portion of the original log is cut away or wasted. 7) All the above features contribute to lower material, handling and construction labor costs, and therefore logs converted according to this invention can produce structures significantly less expensive than comparable conventional log buildings.

SUMMARY OF THE INVENTION

Trimmed debarked logs are quartered lengthwise by two diametrical cuts at right angles to each other and optionally at least one outer edge of each quartered log flattened simultaneously. The quartered logs are sawed into desired lengths, then optionally treated with preservatives by conventional methods, followed by kiln-drying and smoothing the cut surfaces in a planing mill. The quartered log pieces are matched, some reversed end-to-end or top-to-bottom if necessary to balance out any significant diameter change along their length, then placed in a rotated position so that the pointed end of each segment (originally the central longitudinal axis of the log) becomes the outer corner of a rectangle, with the arcuate surfaces of all four segments facing inwardly toward each other, and the flattened edges of each pair facing each other parallelly. If desired, the four quadrant pieces may now be assembled in this position by conventional attachment methods (adhesives, bolts, etc.) to form finished "dressed lumber" pieces rectangular in cross-section; these converted logs, made from smaller diameter timber than conventionally used, are suitable for interior walls, possibly temporary and removable, with small insulation and no load-bearing requirements. For larger load-bearing timbers to be used for outer walls, beams, joists and the like with rectangular cross-sections, the interior substantially quadri-arcuate space formed when the four log quadrants are assembled, may be filled with insulation. Optionally, support elements or braces may be inserted in the space at selected intervals along the length of the converted log for increased strength. Insulation may take the form of rigid extruded foam plastic shaped to conform to the interior space, and to fit complementarily to the four arcuate log surfaces which face inwardly and define the space; alternately loose insulation particle packed in vapor-barrier plastic bags or even poured into the assembled converted logs' spaces during the erection of a building may be employed selectively.

Details of all the preferred embodiments of this invention and of the methods used to create them will be fully described in connection with the accompanying illustrative drawings, wherein:

SHORT FIGURE DESCRIPTION OF DRAWINGS

DESCRIPTION OF THE PREFERRED EMBODIMENTS

Figure 1A:
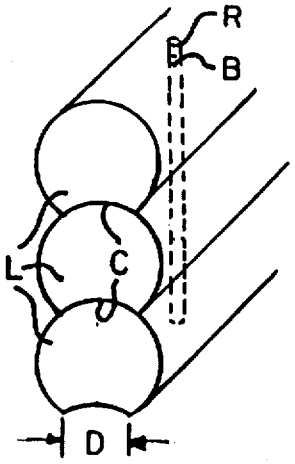
FIG. 1A PRIOR ART
FIGS. 1A–1C are schematic cross-sectional diagrams of prior art log wall construction.
Figure 1B:
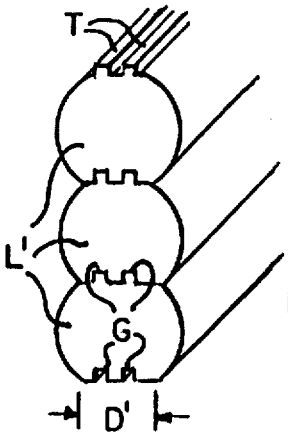
FIG. 1B PRIOR ART
Figure 1C:
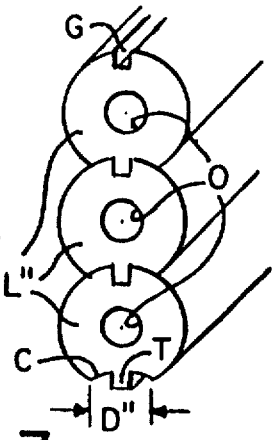
FIG. 1C PRIOR ART
Figure 1D:
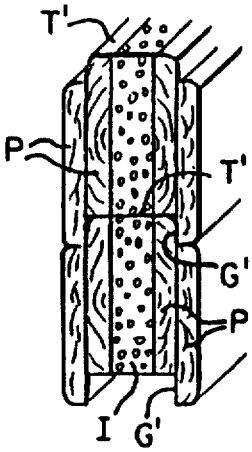
FIG. 1D PRIOR ART
FIG. 1 is a schematic cross-sectional diagram of a wood-laminated wall construction.
Figure 2:
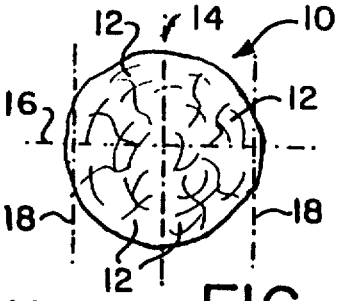
FIG. 2 is an end elevational view of a log to be cut and converted in accordance with the method of this invention.
Figure 3:
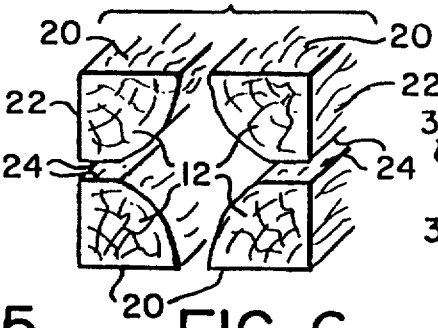
FIG. 3 is a perspective partial exploded view of the log of FIG. 2 after it has been quartered and the segments re-oriented.

FIGS. 2 and 3 show trimmed debarked log 10, to be processed first by dividing it longitudinally into quarter segments 12 by two diametrical cuts at right angles along planes 14 and 16. In the same operation, trimming cuts along planes 18,18', parallel to plane 14 as shown, optionally may be performed; it is obvious that similar trimming cuts may be made in planes parallel to plane 16 as well if desired. Thereafter, the quarter logs may be treated with preservatives either by soaking or pressure-impregnation, than kiln-dried for dimensional stability (see FIG. 18).

As FIG. 3 illustrates, when quarter segments 12 are rotated so that perpendicular cut surfaces 20 and 22 face outwardly and each trimmed flat surface 24 faces another, a rectangular cross-sectional configuration is achieved (with the second trimming cuts noted above, a square configuration can result).

Figure 4:
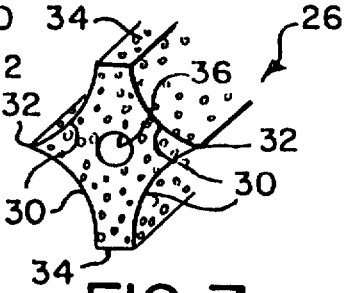
FIG. 4 is a perspective partial view of a rigid foam plastic extrusion to be used as an insulating core element in the practice of this invention.
Figure 5:
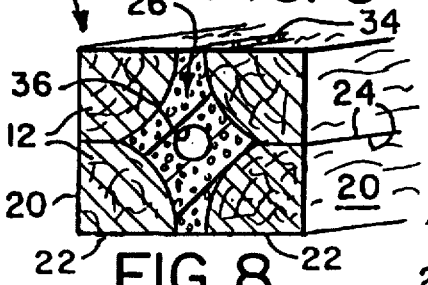
FIG. 5 is a cross-sectional and perspective view of the log segments of FIG. 3 combined with the foam extrusion of FIG. 4 to form a completed rectangular piece of dressed lumber representing a preferred embodiment of this invention.

A preferred embodiment of this invention uses the rigid foam plastic extrusion 26 of FIG. 4 as the core filling space 28 between the quarter logs 12 when assembled (FIG. 5). Foam plastic extrusion 26 is shaped with four concave surfaces 30, each meeting another at cusps 32. The top and bottom ends of concave surfaces 30, as shown, terminate and are connected by horizontal surfaces 34. Extrusion 26 may be formed with a centrally disposed bore 36 as a conduit for cables, wiring, piping or the like. When elements 12 and 26 shown in FIGS. 3 and 4 are combined by conventional attachment methods (adhesive, adhesive with heat/pressure, bolts, screws, etc.—not shown), the resultant piece of converted log dressed lumber 40 shown in FIG. 5 is created.

Figure 6:
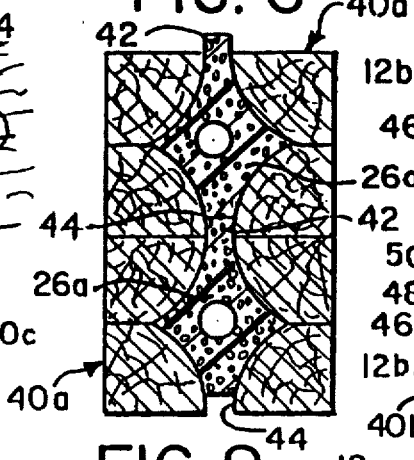
FIG. 6 is a cross-sectional and exploded view of two horizontally disposed pieces of another embodiment of this invention's product, assembled as if part of a wall being erected.

The converted logs 40a of FIG. 6 are similar to log product 40 of FIG. 5, but elements 40a have the foam insulation cores 26a offset so that tongue 42 projecting outwardly and grooves 44 extending inwardly are formed to permit the interlocking of elements 40a when erecting a wall, either as illustrated or with converted logs 40a vertically aligned.

Figure 7:
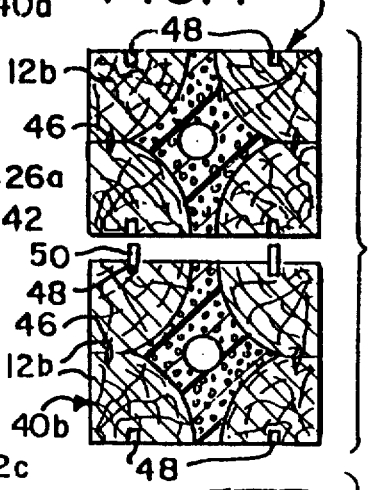
FIG. 7 is a cross-sectional view of two pieces of dressed lumber similar to the view of FIG. 5, but with fastening means added.
Figure 8:
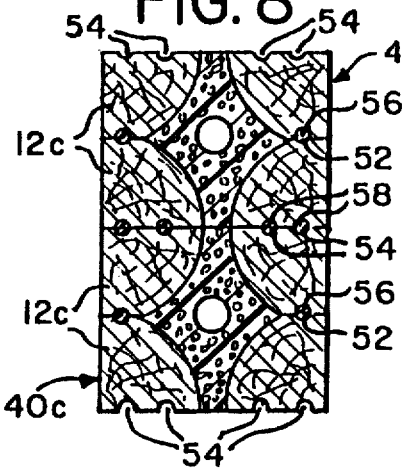
FIG. 8 is a cross-sectional view of two pieces of dressed lumber similar to that of FIG. 5, but with aligning and sealing means added.

In FIG. 7, converted log elements 40b are identical to elements 40, except for splines 46, bores 48 and dowels 50. Splines 46 are installed between quarter-logs 12b during assembly of elements 40b to strengthen them; bores 48 may be drilled at the same time; dowels 50 are to be installed and glued into place during wall assembly to facilitate alignment and registration, and to improvement bonding between each pair of converted log elements 40b.

converted log elements 40c shown in FIG. 8 have their quarter-logs 12c each grooved longitudinally at 52 and 54 to accommodate seals 56 and 58, respectively. Seal elements 56, corresponding in shape to grooves 52, serve to align, insulate, act as a vapor barrier and seal quarter-logs 12c within each converted log element 40c; seal elements 58 perform the same functions between converted log elements 40c as they are used in the erection of a wall.

Figure 9:
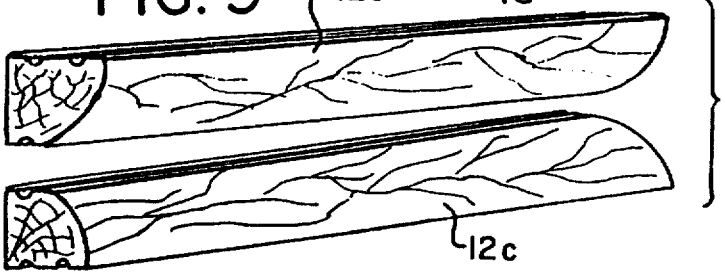
FIG. 9 is a perspective view of two of the log segments of FIG. 8, with one reversed to balance out the change in diameter from one end of the original log to the other.

FIG. 9 illustrates two quarter-log segments 12c which are somewhat tapered along their lengths. The upper segment 12c as shown tapers down from left to right, the lower one oppositely. When assembled, the opposing tapers of the two log quarters will cancel each other out, and a uniform rectangular cross-section will result when this pair of log quarters 12c is put together and joined to a second pair which has been similarly oriented.

Figure 10:
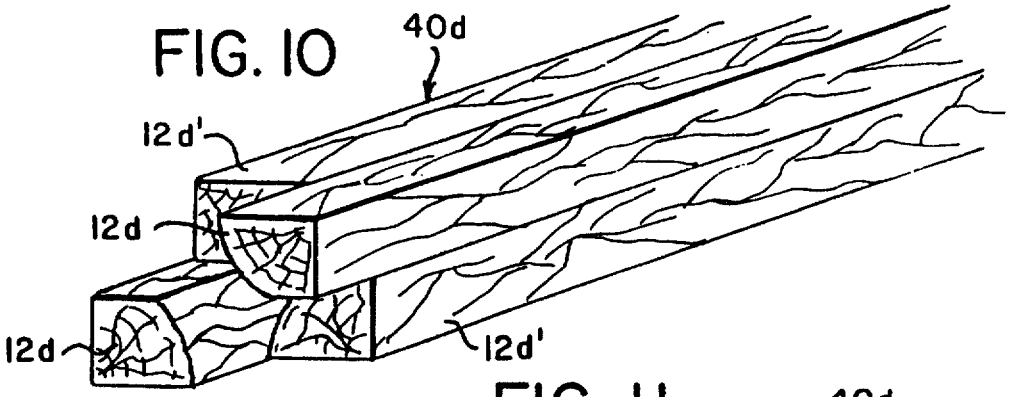
FIG. 10 is a perspective view of a piece of dressed lumber, with two of the four segments offset in length to provide a locking means between two laterally joined pieces of dressed lumber.
Figure 11:
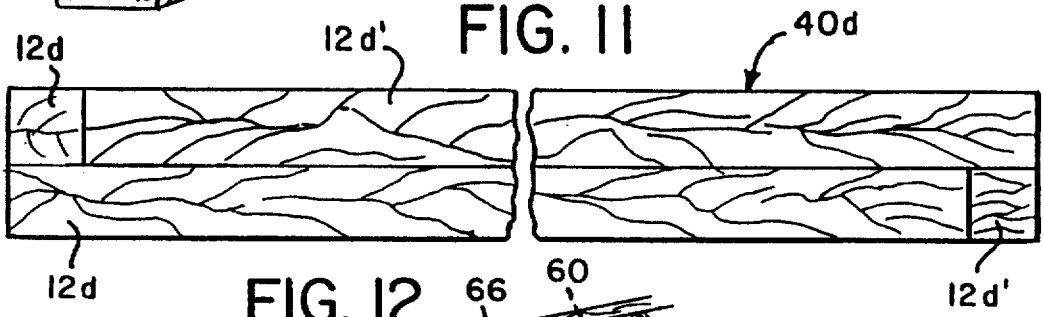
FIG. 11 is a rear elevational view of the piece of dressed lumber of FIG. 10.

A means for interlocking converted logs to be assembled end-to-end is illustrated in FIGS. 10 and 11. Here, converted log 40d has alternating log quarters 12d offset in length with respect to the other two log quarters 12d', permitting lateral interlocking between adjacent converted logs 40d.

Figure 12:
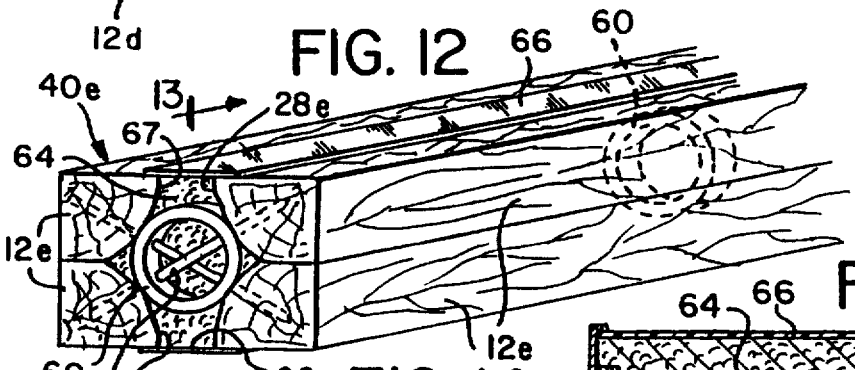
FIG. 12 is an end perspective view of another embodiment of the product of this invention.
Figure 13:
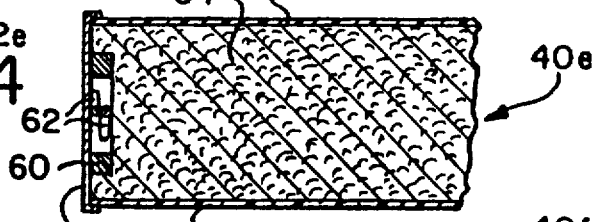
FIG. 13 is a sectional view taken along line 13—13 of FIG. 12.

The converted log product 40e shown in FIGS. 12 and 13 has log quarters 12e secured to each other and to spaced ring-shaped support braces 60 by means of screws 62. Support braces 60 may be made of metal, plastic or wood, and may be fastened to log quarters 12e by conventional means other than that shown (adhesives, bolts, etc.). Space 28e formed between quarter-logs 12e and extending between support braces 60 may be filled with loose insulation particles 64, retained within converted log structure 40e by vapor-barrier plastic film 66 covering top and bottom openings 67 in 40e; end caps 68 may be applied and secured to either or both ends as required. Plastic vapor-barrier film may be made of Tyvek (Reg. TM of E.I. DuPont de Nemours, Inc., Wilmington, Del.) or equivalent. Fiberglass batts (not shown) may replace insulation particles 64.

Figure 14:
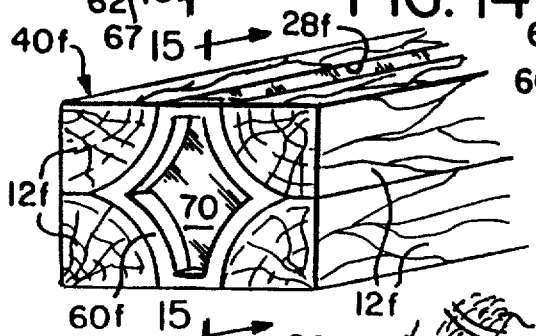
FIG. 14 is an end perspective view of still another embodiment of a product of this invention.
Figure 15:
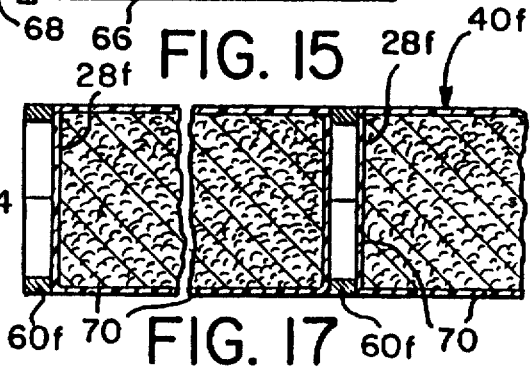
FIG. 15 is a sectional view taken along line 15—15 of FIG. 14.

Still another embodiment of converted log product is illustrated in FIGS. 14 and 15, wherein the dressed lumber product 40f comprises log quarter 12f assembled and surrounding selectively spaced support braces 60f. In this case, supports 60f are shaped to conform to the curvatures of log quarters 12fs interior surfaces, and the spaces 28f between braces 60f are filled with pre-assembled bags 70 filled with insulation particles 64. Bags 70 also conform in shape and size to spaces 28f and may be made conveniently of Tyvek or equivalent vapor-barrier film.

Figure 16:
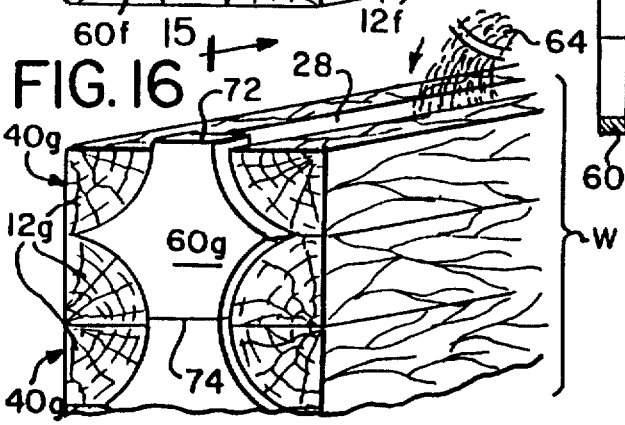
FIG. 16 is an end perspective view of still another embodiment.

FIG. 16 shows a variation of the structure of FIGS. 14 and 15. Here, converted log elements 40g have support braces 60g which are offset in two directions with respect to quarter-logs 12g to provide each element 40g with a projecting tongue 72 and corresponding groove 74 for interlocking the converted logs in erecting a wall. Loose insulation particles 64 are shown being introduced by pouring them into spaces 28g during the erection of wall W, to be followed by sealing filled spaces 28g with vapor-barrier film 66 as in FIG. 12 and end caps 68 as in FIG. 13 (not shown).

Figure 17:
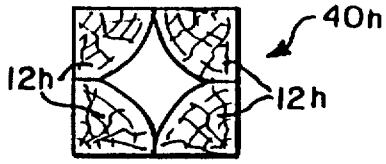
FIG. 17 is a simple form of the product of this invention.

A simple basic embodiment 40h of the converted log product is illustrated im FIG. 17, wherein quarter-logs 12h, of relatively smaller diameter than those used in previously described versions, are assembled with interior space 28h providing the insulative effect of air. The resulting lumber product 40h, substantially square in cross-section, is useful for erecting interior walls or partitions which may be installed as permanent or temporary room dividers, or the like. Means for interlocking, aligning and sealing converted log timbers 40h, previously described herein for other embodiments, may be employed.

Figure 18:
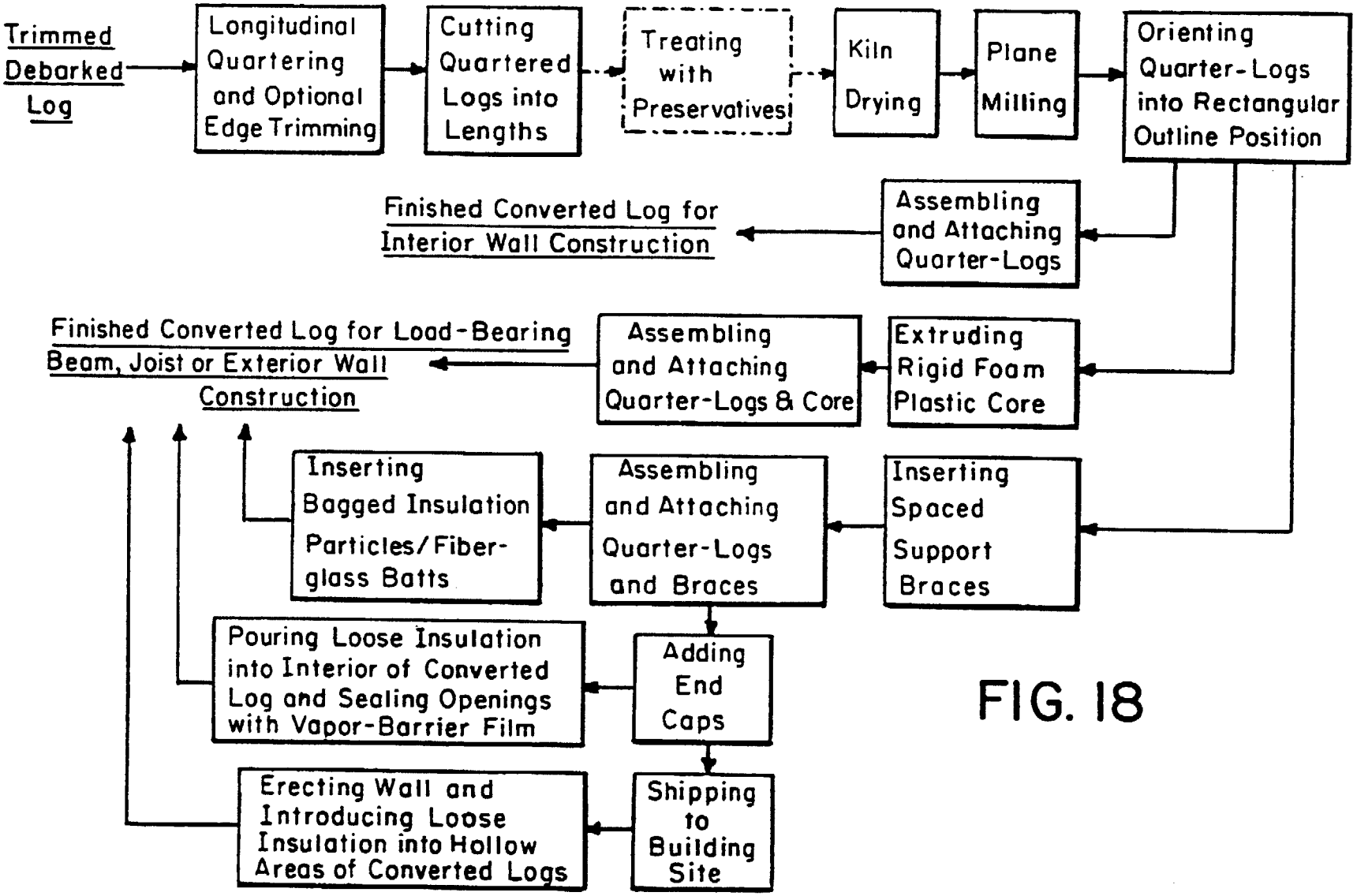
FIG. 18 is a diagrammatic flow sheet outlining the steps in the alternative paths to convert logs in accordance with this invention.

The flow sheet diagram of FIG. 18 describes the steps to be taken to practice alternative forms of the methods for practising this invention and the resultant various converted log products prepared thereby. In combination with the descriptions of the embodiments hereinabove presented, the diagram of FIG. 18 should be substantially self-explanatory.

The converted log products of this invention have many advantages over regular logs and their prior art handling. Since an 8 inch diameter log, for example, can be converted into a finished timer 7"×12" which has the capacity to be used for load-bearing exterior wall construction, or as beams or joists, the growing cycle for a tree to be used for this purpose is therefore greatly reduced, thus minimizing the raw material cost, no matter which species of wood is chosen. The smooth, attractive wood interior and exterior wall surfaces provided require neither siding on the outside nor drywall, such as plasterboard, on the inside, further reducing construction costs markedly. The converted logs themselves are significantly lighter in weight, easier and less expensive to handle; they are stronger, and make a wall with an insulation value exceeding that of conventional logs almost twice the diameter of those used for the converted log products of this invention.

The method of converting logs, and the product resulting therefrom, have been described in full detail. Various other combinations, substitutions and alternate procedures in the practice of this invention are possible without departing from its concepts, spirit or scope, which is defined and limited only by the ensuing claims, wherein:

I claim:

1. The method of converting logs into finished dressed lumber, which comprises the steps of: trimming and debarking the logs; cutting each log longitudinally and diametrically into four equal right-angled segments; transversely cutting quartered logs into selected lengths; kiln-drying the quartered logs; plane milling the cut surfaces of the quartered logs; [and] assembling the quartered logs into such position that the arcuate surfaces of [the] four log quarters [from each log] face toward each other, and the cut, planed surfaces *thereof* face outwardly and are arranged to form a cross-sectional peripheral configuration which is rectangular[.]; *and inserting selectively placed support braces at intervals in the interior space created when the log quarters are oriented into position; and fixedly joining both the arranged log quarters and the spaced support braces in the rectangular configuration.*

2. The method of converting logs as defined by claim 1, further comprising the step of treating the quartered logs with preservatives, following the step of cutting the quartered logs into selective lengths and before their kiln-drying.

3. The method of converting logs as defined by claim 1, further comprising the step of extruding [a] foam plastic [core] *cores* shaped to conform to the interior space created when the log quarters are assembled; *and* fitting the foam plastic cores into the interior space [; and] *before* fixedly joining the log quarters, *the spaced support braces* and the foam plastic [core] *cores* in the arranged rectangular configuration.

[4. The method of converting logs as defined by claim 1, further comprising the steps of: inserting selectively spaced support braces into the interior space created when the log quarters are oriented and assembled, following the step of assembling the log quarters into position; and fixedly joining both the log quarters and the spaced support braces in the arranged rectangular configuration.]

5. The method of converting logs as defined by claim [4] *1*, further comprising the step of inserting insulative material into the spaces remaining between the fixedly attached log quarters and the selectively spaced support braces.

6. The method of converting logs as defined by claim [4] *1*, further comprising the steps of: adding end caps to the fixedly attached log quarters and support braces; pouring loose insulative material into the interior spaces remaining between the log quarters and the support braces; and sealing the openings at the surfaces of the converted log with vapor-barrier plastic film.

7. The method of converting logs as defined by claim [4] *1*, further comprising the steps of: shipping converted logs to the building site; erecting a wall of converted logs; and pouring loose insulative material into the hollow areas of the converted log wall.

8. Converted log product, which comprises:

[a] *at least one* log, *each* longitudinally divided by two diametric cuts at right angles to each other to form four equal quarter-log segments *from each of said at least one log*; [and]

means for fastening *four* said quarter-log segments together, *said* four quarter-log segments being positioned so that the arcuate surfaces of said *four* segments face inwardly toward each other and so that each cut surface of said segments face outwardly, *being* so oriented that the cross-sectional peripheral outline of the converted log product is rectangular[.] *; and*

*support bracing means positioned in fitting engagement with said arcuate surfaces of said four quarter-log segments and fixedly attached thereto by said fastening means, said bracing support means being selectively spaced at intervals when inserted into and secured in the interior space between said four segments, along the length of said four assembled segments.*

9. Converted log product as defined by claim 8, wherein each of said quarter-log segments has at least one of its two corners connecting said arcuate surface with one of said cut surfaces trimmed off and flattened to produce a flat surface perpendicular to said one of said cut surfaces.

10. Converted log product as defined by claim 8, further comprising [a] rigid foam plastic [extrusion] *extrusions* conforming in shape and size to the interior space remaining between said quarter-log segments *and said support bracing means,* said [extrusion] *extrusions* being positioned in said space and fixedly attached to said quarter-log segments *and said support bracing means* by said fastening means to form a unitary converted log product.

11. Converted log product as defined by claim 10, wherein *one* said rigid extrusion is so positioned with respect to said quarter-log segments that one end of said extrusion extends beyond said cut surfaces in one direction to form a projecting tongue, while a corresponding groove is left between said quarter-log segments in the opposite direction, whereby at least two converted log products may be interlockedly assembled together.

12. Converted log product as defined by claim 9, wherein said means for fastening said quarter-log segments comprises:

at least one longitudinal groove in each of said flat surfaces of said quarter-log segments; and sealing means, conforming in shape and fittingly engaging said at least one longitudinal groove in each of said flat surfaces, whereby, when two said quarter-log segments are assembled together, said sealing means serves to align, register, seal and act as a vapor-barrier between said quarter-log segments.

13. Converted log product as defined by claim 8, further comprising:

at least one longitudinal groove in one said cut surface of each said quarter-log segment, said grooves being positioned on opposite faces of said rectangular converted log product; and sealing means, conforming in shape and fittingly engaging said at least one longitudinal groove in the first said rectangular converted log product and said at least one longitudinal groove in the facing second said rectangular converted log product, whereby, when said first and said said second converted log products are assembled together, said sealing means serves to align, register, seal and act as a vapor-barrier between said converted log products.

14. Converted log product as defined in claim 8, wherein one of a pair of quarter-log segments may be reversed end-to-end before assembly to offset any significant taper which may have existed in said original log, thereby ensuring the rectangularity of the resultant log product when assembled.

15. Converted log product as defined in claim 8, wherein at least one of said quarter-log segments is offset in length with respect to the remaining said quarter-log segments, whereby said at least one offset quarter-log projects from one end of the rectangular converted log product to form a tongue, and is recessed from the opposite end of the converted log product to form a groove, thus permitting two converted log products, when assembled endwise, to be interlocked.

16. Converted log product as defined by claim 8, further comprising:

[support bracing means positioned in fitting engagement with said arcuate surfaces of said quarter-log segments and fixedly attached thereto by said fastening means, said bracing means being selectively spaced when installed along the length of the converted log product; and]

insulation means introduced into, and substantially filling, the interior space remaining between said bracing means and said quarter-log segments.

17. Converted log product as defined by claim [16] *8*, further comprising:

vapor-barrier plastic film overlying and sealing openings remaining between said quarter-log segments on opposite sides of the converted log product; and end caps, for fitting engagement with either end of the converted log product as required and fittingly attached thereto.

18. Converted log product as defined by claim 16, wherein said bracing means are shaped to follow the contours of said arcuate surfaces of said quarter-log segments, and wherein said insulation means comprises loose insulation particles retained in vapor-barrier plastic film bags, said bags fitting within said interior remaining space.

19. Converted log product as defined by claim 16, wherein said insulation means comprises fiberglass batts sized to fit within said interior remaining space.

20. Converted log product as defined by claim [18] *8*, wherein each said support bracing means positioned at the ends of the converted log product comprises a solid element adapted to serve as an end plate and selectively as a tongue-and-groove system for interlocking engagement of two converted log products in any direction.

21. Converted log product as defined in claim 8, further comprising insulation means to be introduced into the interior space remaining between said quarter-log segments during the erection of a wall being constructed with converted log products.

* * * * *